US007471892B2

(12) United States Patent
Spaulding et al.

(10) Patent No.: US 7,471,892 B2
(45) Date of Patent: Dec. 30, 2008

(54) VISION-ASSISTED HAND TOOLS

(75) Inventors: James R. Spaulding, Macomb, MI (US); Richard A. Knoth, Lake Orion, MI (US); Nidamaluri S. Nagesh, West Bloomfield, MI (US); Tony J. Deschutter, St. Clair Shores, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 498 days.

(21) Appl. No.: 11/225,281

(22) Filed: Sep. 13, 2005

(65) Prior Publication Data

US 2007/0058970 A1 Mar. 15, 2007

(51) Int. Cl.
*G03B 17/48* (2006.01)

(52) U.S. Cl. .............................. 396/429; 76/1; 81/57.13

(58) Field of Classification Search .................. 396/17, 396/429; 348/45, 65; 600/109, 111, 118; 76/1, 9, 10, 114, 119; 173/171; 382/141; 81/57.13, 57.29, 57.39
See application file for complete search history.

(56) References Cited

U.S. PATENT DOCUMENTS 4,346,630 A * 8/1982 Hanson ..................... 81/57.13
5,343,391 A * 8/1994 Mushabac .................... 433/76
5,928,137 A * 7/1999 Green ......................... 600/160
6,510,006 B1 * 1/2003 Togino ........................ 359/631
6,655,377 B2 * 12/2003 Pacey .................... 128/200.26
2002/0077528 A1 6/2002 Landgraf
2003/0060679 A1 * 3/2003 Murata et al. ............... 600/111
2005/0053435 A1 * 3/2005 Krause et al. ............... 408/130
2006/0057534 A1 * 3/2006 Saliger ........................ 433/29

FOREIGN PATENT DOCUMENTS

DE 4009438 A1 9/1991
DE 20307305 U1 8/2003
DE 20314806 U1 5/2006

* cited by examiner

*Primary Examiner*—Christopher Mahoney
*Assistant Examiner*—Warren K Fenwick

(57) ABSTRACT

A hand tool has two digital video cameras mounted thereon adjacent to a working end of the tool for viewing a work site, which video cameras are connected to a pair of liquid crystal displays (LCDs) mounted on the tool proximate a control end of the tool. The hand tool includes a barrel with a handle at the control end and a control operator for activating the tool, wherein the control operator is in operative relationship with the handle and wherein the working end of the tool is positioned at the end of the barrel opposite the control end of the tool. In an illustrated example, the cameras and LCDs are mounted on a pneumatic nut runner with a T-head tool drive.

9 Claims, 4 Drawing Sheets

VISION-ASSISTED HAND TOOLS

FIELD OF THE INVENTION

The present invention is directed to hand tools, and more particularly, to hand tools having vision assistance that enhances use of the tool at otherwise obscured work sites.

BACKGROUND OF THE INVENTION

Occasionally during the design of products, such as automotive vehicles, the placement of fasteners is such that the placement results in a blind or awkward installation procedure for the installer of the fastener. This situation can result in the need to design unique tools and can result in the frustration and fatigue of installers as they cope with the inconvenience of not being able to see what they are doing. At worst, a "no build condition" may result. This may require redesign of that portion of the automotive vehicle where the vision problem occurs. Many redesigns affect more vehicle structure than just the work site at issue and can negatively affect and change assembly and repair procedures, thus increasing the cost of a vehicle and contributing to delay of a vehicle's commercial distribution. It is therefore desirable to retain both the production design of vehicles and to retain hand tools that production line workers are familiar with using.

SUMMARY OF THE INVENTION

In view of the aforementioned considerations, the present invention is directed to a hand tool having two video cameras mounted thereon adjacent to a working end of the tool for observing a work site in real time, which video cameras are connected to a pair of liquid crystal displays mounted on the tool proximate a control end of the tool for viewing the work site in real time.

In a further aspect of the invention, the hand tool comprises a barrel with a handle at the control end having a control operator for activating the tool, wherein the control operator is in operative relationship with the handle and wherein the working end of the tool is positioned at the end of the barrel opposite the control end of the tool.

In a still further aspect of the invention, the pair of cameras are mounted on a mounting plate having a clamping portion that is clamped to the barrel inboard of the working end, which mounting plate has openings therethrough for lenses of the cameras and mountings thereon for attaching the cameras to the plate for orienting the focus of the lenses in the direction of the work site.

In a still further aspect of the invention, the tool is a pneumatic tool, wherein compressed air is applied to the tool through an opening in the handle to power a pneumatic motor that is connected to a drive shaft which extends through the barrel to the working end of the tool to operate a tool drive.

In still a further aspect of the invention, the tool drive is connected to the drive shaft by a T-head so as to direct power transversely of the drive shaft.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
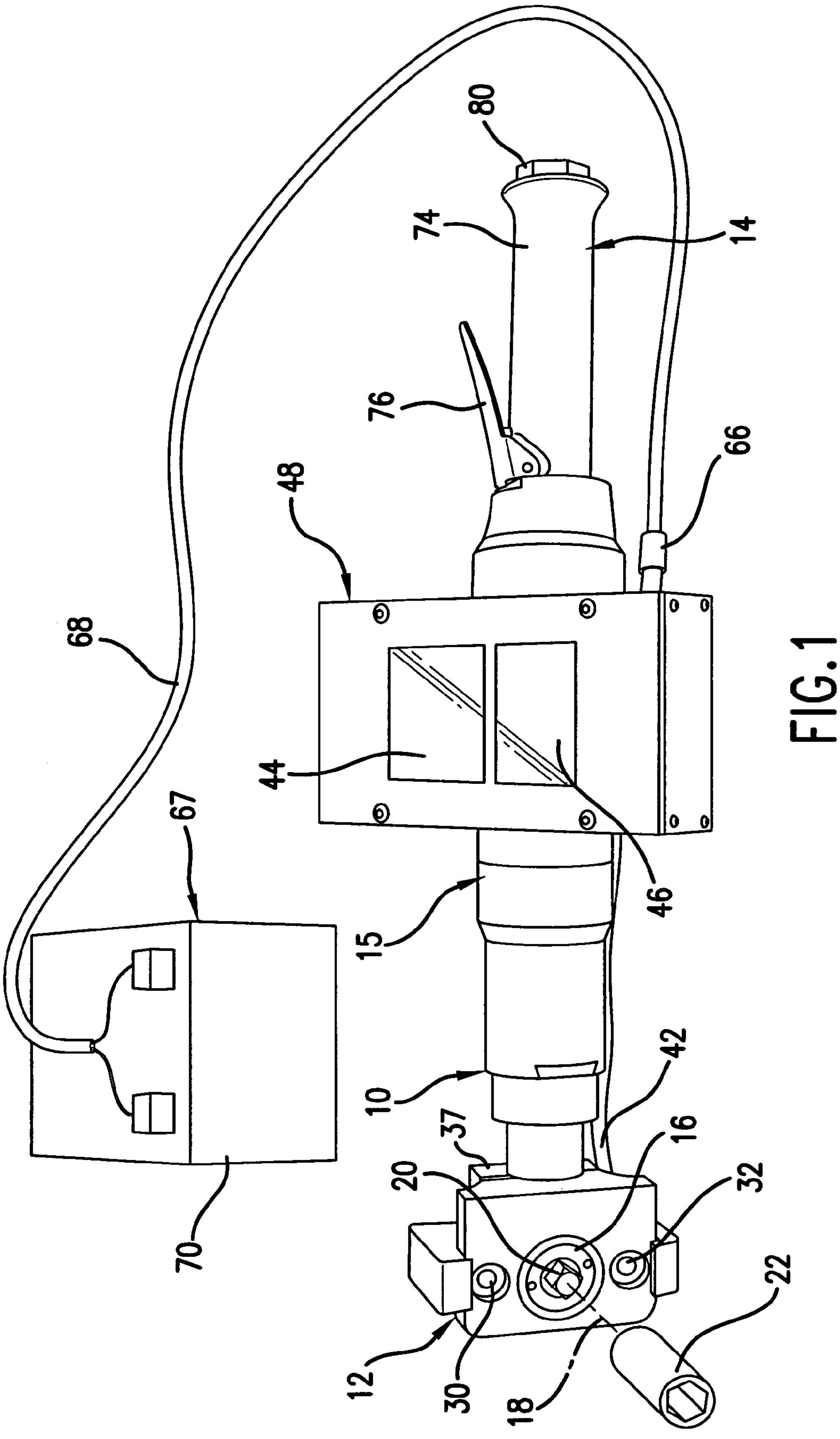
FIG. 1 is a front perspective view of a hand tool configured in accordance with the principles of the present invention.

Referring now to FIG. 1, a hand tool 10 has a working end 12 and a control end 14 joined by a barrel portion 15. The working end 12 has a tool drive 16 for rotation about a drive axis 18. In the illustrated embodiment, the tool drive 16 is configured as a square stud 20 which mates with a socket 22, or other tool, to rotate a nut (not shown) mounted on a bolt (not shown). The nut and bolt are disposed at a work site which is obscured by other structures. For example, the work site may be on or in an automotive vehicle having structural portions which obscure the work site from the view. In a specific example, the work site may be a battery tray within the vehicle. By utilizing a threaded member and a retainer in the form of a nut, a retaining edge or tab at the bottom of the battery is secured to the battery tray. The socket 22 is rotated by the stud 20 to fasten the retainer on the threaded fastener. Since the work site is obscured, threading the retainer on the threaded member is difficult without the visual assistance of the present invention.

Figure 2:
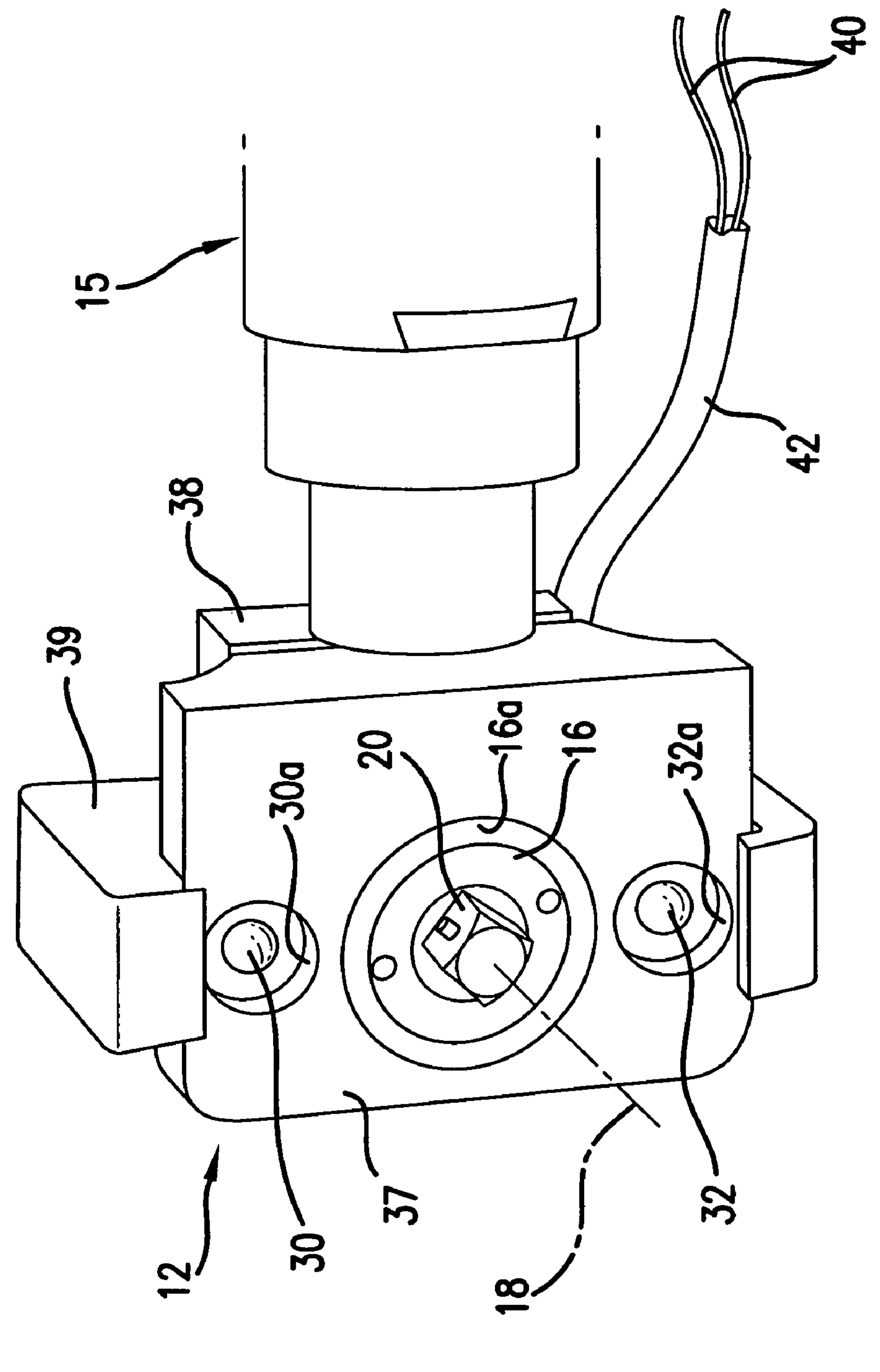
FIG. 2 is a side view of a working end of the hand tool.
Figure 3:
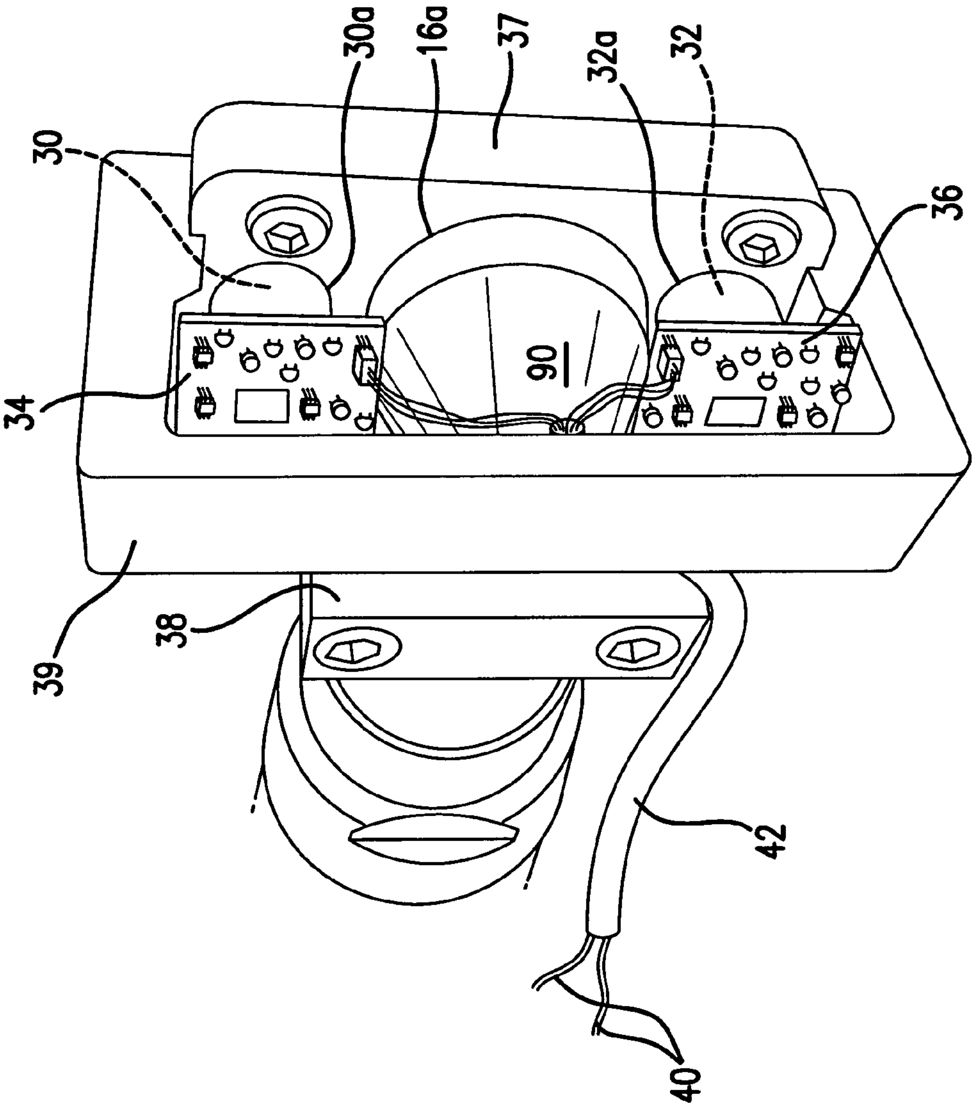
FIG. 3 is a perspective view of a pair of cameras mounted proximate the working end of the hand tool.

As seen in FIGS. 1 and 2, a pair of lenses 30 and 32 are disposed on opposite sides of the axis 18 to provide observation of the work site and the targeted nut or fastener in real time. As is seen in FIG. 3, the lenses 30 and 32 are associated with video camera circuit boards 34 and 36 which have digital circuitry thereon. The lenses 30 and 32 are available packaged with the circuit boards 34 and 36 from Matsushita Electric under the Panasonic tradename and are each designated as part number GP-KX121/51.

As is best seen in FIGS. 2 and 3, the lenses 30 and 32 and the printed circuit boards 34 and 36 are mounted on a panel 37 which is to the working end 12 of the hand tool 10 with a C-clamp 38 and which has openings therethrough 16*a*, 30*a* and 32*a* aligned with the tool drive 16, the first lens 30 and the second lens 32. A U-shaped shield 39 fits over the circuit boards 34 and 36 and over back portions of the lenses 30 and 32 to protect the circuit boards and lenses from damage.

Figure 4:
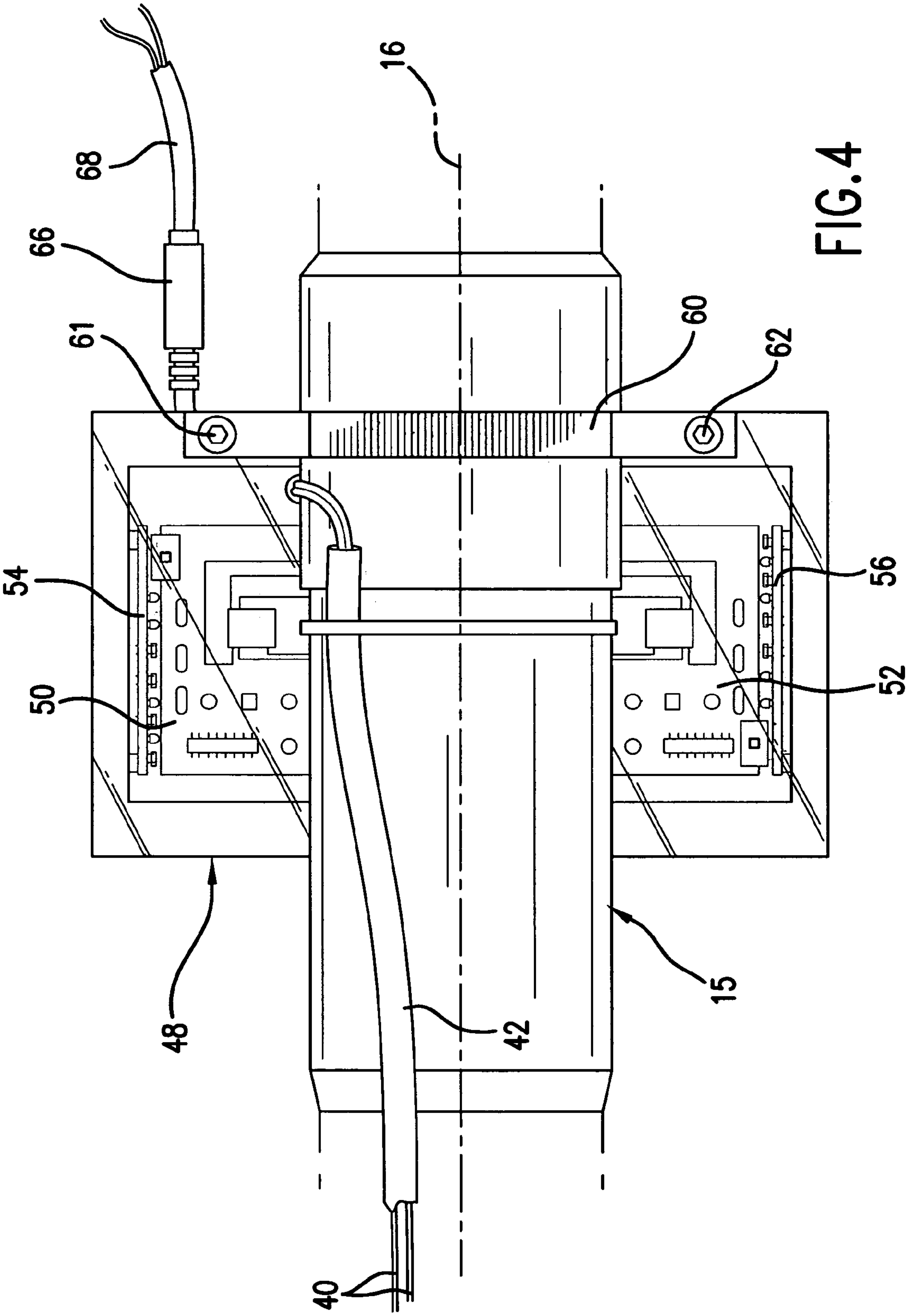
FIG. 4 is a side view of the back of a housing mounting a pair of liquid crystal displays shown in FIG. 1 and containing circuit boards for driving the displays.

As is seen in FIG. 1, images from the video camera circuit boards 34 and 36 are transmitted via connector cables 40 in a sheath 42 to a pair of liquid crystal displays (LCDs) 44 and 46 which are mounted on a housing 48 that is secured to the barrel portion 15 of the hand tool 10 for viewing the work site in real time. Further, as is seen in FIG. 4, the LCD liquid crystal displays 44 and 46 are connected to LCD circuits 50 and 52 within the housing 48. The circuits 50 and 52 are mounted on pairs of perpendicularly disposed printed circuit boards 54 and 56, one for each of the LCDs 44 and 46 so as to provide space within the housing 44 to receive the barrel portion 15 of the hand tool 10. The LCDs 50 and 52 and associated circuits 50 and 52 on circuit boards 54 and 56 are available from ACCELVISION and designated as part number LCD25M.

As is seen in FIG. 4, the housing 48 is clamped to the barrel portion 15 of the tool 10 by a C-clamp 60 that is held by bolts 61 and 62 which thread into the wall of the housing so as to secure the housing in place. As is seen in FIG. 1, preferably a jack 66 for a power supply 67 is mounted on or in the housing 48 and is connected by a power supply cable 68 to the power supply, which is preferably a battery 70. In this way, the tool 10 is not burdened by the weight of the power supply 70 for the camera circuit boards 34 and 36 and the LCD circuits 50 and 52.

In the illustrated embodiment, the control end 14 shown in FIG. 1 comprises a handle 74 with an actuator 76 pivoted thereon. Upon pressing the actuator lever 76 with one's thumb, air pressure is provided through the end 80 of the operating handle 74 to power a pneumatic motor (not shown) within the barrel portion 15 of the hand tool 10. The pneumatic motor rotates a drive shaft which is connected via a gear to the rotary stud 20 by using a T-head connection 90.

As is seen in the illustrated embodiment, the optical system comprising the cameras 34 and 36, the liquid crystal displays 44 and 46 are mounted on the barrel 15 of the hand tool 10 so that the axis 18 is oblique with respect to the plane defined by the face of the liquid crystal displays 44 and 46. The clamp 60 mounting the housing 48 supporting liquid crystal displays 44 and 46 can be loosened so that the housing 48 is rotatable about the axis of the hand tool 10 to be oriented at any desired angular position with respect to the tool drive axis 18 and the actuator 76 on handle 74. Consequently, optical viewing of the work site is facilitated by ergonomically positioning the liquid crystal displays 44 and 46 with respect to the actuator 76 and the axis 18 of the driving stud 20 and socket 22.

If the work site is dark, the hand tool 10 can include supplemental illumination at the working end 12 by providing an attached light bulb (not shown) or LED (not shown).

An existing hand tool 10 configured as a pneumatic tool, such as a pneumatic nut runner available from Cleco Air Tools and identified as "55 series T-head 28 to 170 NM," is used as a preferred tool with which the present work site viewing arrangement is utilized. However, hand tools of other configurations, such as but not limited to, electrically powered tools or manually powered tools, having other functions such as driving screws, riveting, hammering, etc. can be configured to utilize the work site viewing arrangement of the present invention.

From the foregoing description, one skilled in the art can easily ascertain the essential characteristics of this invention, and without departing from the spirit and scope thereof, can make various changes and modifications of the invention to adapt it to various usages and conditions.

We claim:

1. A hand tool for performing work at an obscured work site comprising:

a tool body having a working end and a control end displaced from one another, the working end having a tool drive for operation with respect to a drive axis and for activation by operation of a control at the control end, two digital cameras positioned at a camera site located at the working end to provide an image of work being performed, a display positioned proximate the control end for receiving and displaying in real time the image of the work being performed, each of the two digital cameras having a lens disposed on opposite sides of the tool drive, wherein the display comprises two LCD screens, one associated with each digital camera for viewing in real time images from opposite sides of the work station and wherein the display is positioned between the working end and drive end of the tool with connector cables extending between the cameras and the display, a power connector for connecting the display to a remote source of current for the display and the cameras, wherein the tool comprises a barrel with a handle at the control end and an actuator in association with the handle for activating the tool, and the tool is powered pneumatically by an air pressure line entering the tool through the handle and powering the tool drive through a pneumatic motor disposed in the barrel which is connected by a drive shaft to the tool drive, and the tool drive is oriented transverse to the drive shaft and the lens of each of the cameras is oriented to focus in the same direction as the axis of the tool drive.

2. The tool of claim 1 wherein the cameras are mounted on a mounting panel that has an opening therethrough which receives the tool drive, the panel having a clamp thereon for clamping the panel to the barrel, the panel having lens openings therethrough and two camera mounts thereon for securing the camera thereto with the lens of each camera aligned with the lens openings.

3. The tool of claim 2 wherein the mounting panel has a protective shield attached thereto which overlies the cameras.

4. The tool of claim 1 wherein a housing is provided for containing circuitry connected to outputs from the digital video cameras for driving the LCD screens, the housing having a clamp thereon for securing the housing to the barrel of the tool between the control and working ends of the tool.

5. A hand tool for performing work at an obscured work site comprising:

a tool body having a working end and a control end displaced from one another, the working end having a tool drive for rotation about a drive axis activated by operation of a control at the control end, two digital video cameras positioned at a camera site located at the working end, each digital camera having a lens disposed on opposite sides of the tool drive to provide an image of work being performed at the work site, a display comprising two LCD screens, one associated with each camera; the two LCD screens being positioned proximate the control end of the tool for receiving and displaying in real time images of the work being performed in front of and from opposite sides of the tool drive, wherein the display is positioned between the working end and drive end of the tool with connector cables extending between the cameras and displays, a power connector for connecting the display to a remote battery is provided at the display for connection to a remote source of current for energizing the display and cameras, wherein the tool has a barrel with a handle at the control end axially displaced from the display and an actuator in association with the handle for activating the tool, and the is powered pneumatically by an air pressure line entering the tool through the handle and powering the drive with a pneumatic motor disposed in the barrel which is connected by a drive shaft to the tool drive, and wherein the tool drive is oriented transverse to the drive shaft and the lenses of the cameras are oriented to focus in the same direction as the axis of the tool drive.

6. The tool of claim 5 wherein the cameras are mounted on a mounting plate that has an opening therethrough which receives the tool drive; the mounting plate having a clamp thereon for clamping the plate to the barrel, lens openings therethrough and two camera circuit mounts thereon for securing camera circuits thereto with the lenses of the cameras aligned with the lens openings.

7. The tool of claim 6 wherein the mounting plate has a protective shield attached thereto which overlies the camera circuits.

8. The tool of claim 5 wherein a housing is provided for containing a pair of LCD circuits each connected to an output from one of the video cameras for driving one of the LCD screens, the housing having a C-clamp thereon for adjustably securing the housing to the barrel of the tool between the control and working ends of the tool in angular positions with respect to the axis of the tool drive.

9. The tool of claim 8 wherein each of the LCD circuits is comprised of two circuit boards that are oriented transversely with respect to one another in the housing to locate the circuitry on opposite side walls and a bottom wall of the housing, thus providing a central space in the housing which is open to receive the barrel of the hand tool therethrough with the two screens on the housing displaced radially from the barrel on a front side of the housing.

* * * * *